(12) United States Patent
Gordon

(10) Patent No.: US 8,224,025 B2
(45) Date of Patent: Jul. 17, 2012

(54) GROUP TRACKING IN MOTION CAPTURE

(75) Inventor: Demian Gordon, Culver City, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 986 days.

(21) Appl. No.: 11/614,867

(22) Filed: Dec. 21, 2006

(65) Prior Publication Data

US 2007/0146370 A1  Jun. 28, 2007

Related U.S. Application Data

(60) Provisional application No. 60/753,386, filed on Dec. 23, 2005.

(51) Int. Cl.
*G06K 9/00* (2006.01)
(52) U.S. Cl. ........................................................ 382/103
(58) Field of Classification Search .................. 382/103, 382/154, 115–118
See application file for complete search history.

(56) References Cited

U.S. PATENT DOCUMENTS

| | | | |
|---|---|---|---|
| 4,836,219 A |  | 6/1989 | Hobson et al. |
| 5,227,985 A | * | 7/1993 | DeMenthon ................ 702/153 |
| 5,517,021 A |  | 5/1996 | Kaufman et al. |
| 5,767,861 A | * | 6/1998 | Kimura ....................... 345/473 |
| 6,026,321 A |  | 2/2000 | Miyata et al. |
| 6,335,977 B1 | * | 1/2002 | Kage ........................... 382/107 |
| 6,379,393 B1 |  | 4/2002 | Mavroidis et al. |
| 6,673,027 B2 |  | 1/2004 | Fischer |
| 6,681,031 B2 | * | 1/2004 | Cohen et al. ................ 382/103 |
| 6,720,984 B1 |  | 4/2004 | Jorgensen et al. |
| 6,774,885 B1 |  | 8/2004 | Even-Zohar |
| 6,819,410 B2 | * | 11/2004 | Adameck et al. ............. 356/71 |
| 7,129,927 B2 | * | 10/2006 | Mattsson .................... 345/158 |
| 2002/0102010 A1 | * | 8/2002 | Liu et al. ..................... 382/107 |
| 2003/0215130 A1 |  | 11/2003 | Nakamura et al. |
| 2004/0095352 A1 |  | 5/2004 | Huang |
| 2004/0155962 A1 |  | 8/2004 | Marks |
| 2004/0166954 A1 |  | 8/2004 | Erickson et al. |
| 2005/0163342 A1 | * | 7/2005 | Persky ......................... 382/103 |
| 2005/0261559 A1 |  | 11/2005 | Mumford et al. |
| 2006/0004296 A1 |  | 1/2006 | Huiku et al. |
| 2006/0055699 A1 | * | 3/2006 | Perlman et al. ............. 345/473 |
| 2007/0166669 A1 | * | 7/2007 | Page ............................ 434/21 |

OTHER PUBLICATIONS

Lucero, Jorge C., Munhall, Kevin G., "A Model of Facial Biomechanics for Speech Production", Nov. 1999, Acoustical Society of America, vol. 106, No. 5, pp. 2834-2842.
Lee, Sooha Park, "Facial Animation System with Realistic Eye Movement Based on a Cognitive Model for Virtual Agents", 2002, Dissertation in Computer and Information Science, University of Pennsylvania, pp. 1-4, 21 and 51-53.
International Search Report and Written Opinion issued in PCT/US2006/062573, mailed on Nov. 6, 2007.

* cited by examiner

*Primary Examiner* — Alex Liew
(74) *Attorney, Agent, or Firm* — Samuel S. Lee; Procopio, Cory, Hargreaves & Savitch LLP

(57) ABSTRACT

Tracking a group of motion capture markers in a sequence of frames, comprising: establishing a group relationship among a plurality of motion capture markers in a current frame; and labeling the plurality of motion capture markers in the current frame using the group relationship.

34 Claims, 12 Drawing Sheets

GROUP TRACKING IN MOTION CAPTURE

CROSS-REFERENCE TO RELATED APPLICATIONS

This application claims the benefit of priority of U.S. Provisional Patent Application Ser. No. 60/753,386, filed Dec. 23, 2005, entitled "Group Tracking in Motion Capture." This application is also related to U.S. patent application Ser. No. 10/984,488, filed Nov. 8, 2004, entitled "System and Method for Tracking Facial Muscle and Eye Motion for Computer Graphics Animation." The disclosures of the above-mentioned patent applications are incorporated herein by reference.

BACKGROUND

The present invention relates generally to motion capture, and more particularly to methods and systems for group tracking of motion capture marker data.

A typical motion capture system includes multiple fixed cameras surrounding a volume of space. The cameras record the movement of markers attached to a target, such as a person. Based on the recorded movement, a model of the target's motion can be derived and then used for generating a graphical representation of that movement, such as in a movie or video game.

In one implementation of a motion capture system, the markers on the captured images are labeled to facilitate identifying what the marker represents. A large number of images may be captured for a particular scene, from which is derived a sequence of frames of volumetric data. Each marker in the scene is tracked individually through the sequence of frames in order to generate a graphical representation of its movement. The tracking task is complex when, for example, the trajectories of several markers attached to an actor must be tracked through a large number of frames (volumes). The task becomes significantly more complex when multiple actors and/or objects equipped with a plurality of markers interact in the scene.

Therefore, what is needed is a system and method that overcomes these significant problems found in tracking multiple motion capture markers using conventional methods as described above.

SUMMARY

The present invention provides group tracking motion capture marker data in a sequence of motion capture data frames.

In one implementation, a method of tracking a group of motion capture markers in a sequence of frames comprises: establishing a group relationship among a plurality of motion capture markers in a current frame; and labeling the plurality of motion capture markers in the current frame using the group relationship.

In another implementation, a system for tracking a group of motion capture markers in a sequence of frames comprises: a reference group module, for generating reference group of motion capture marker information; and a group trajectory labeling module, for generating labeled marker group trajectory data using the reference group of motion capture marker information.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 3A is a illustrates a computer system and user;

DETAILED DESCRIPTION

Certain implementations as disclosed herein provide for methods and systems to track the trajectories of motion capture markers in sequential volumes of motion capture data. In one implementation, tracking individual motion capture markers is aided significantly by tracking a group comprising individual motion capture markers and utilizing group relationship information.

For example, one method as disclosed herein allows for establishing a group relationship in a reference frame of motion capture data, labeling the markers of that group, and then labeling the markers of other frames of motion capture data using the group relationship information established in the reference frame. The group relationship can be established in the reference frame using information as to markers of interest, or by applying a predetermined marker group relationship. Further, group relationship information can be aided by a shape analysis, including a stretch analysis, to label markers in other frames.

In another example, a group tracking system hosted on a computer includes a reference group module and a group trajectory labeling module. The system receives frame data including volumetric marker position data, develops reference group information from the marker position data, and generates labeled marker group trajectory data. The system may further include a shape analysis module and a stretch analysis module.

After reading this description it will become apparent to one skilled in the art how to implement the invention in various alternative implementations and alternative applications. However, although various implementations of the present invention will be described herein, it is understood that these implementations are presented by way of example only, and not limitation. As such, this detailed description of various alternative implementations should not be construed to limit the scope or breadth of the present invention as set forth in the appended claims.

Figure 1:
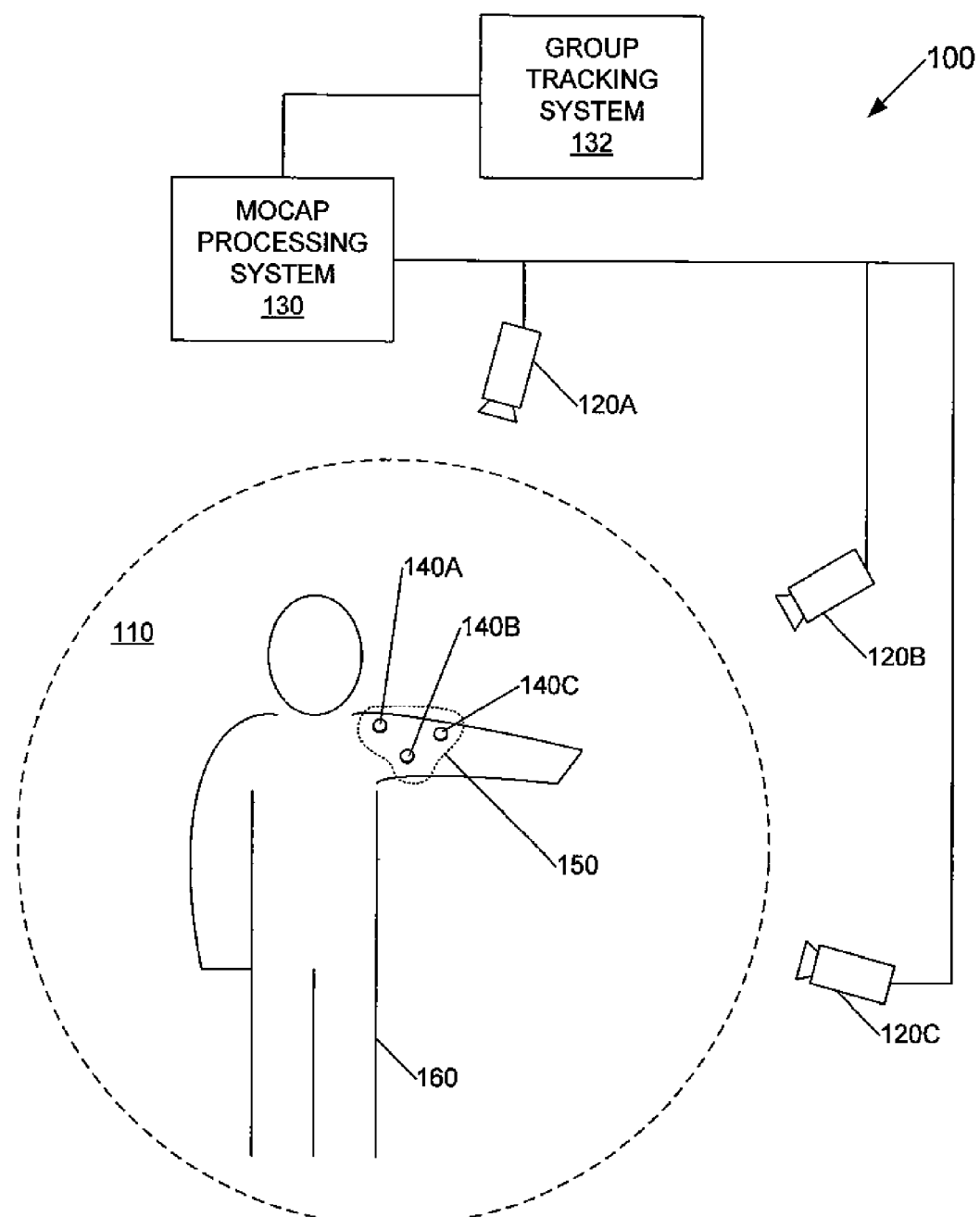
FIG. 1 is an illustration of an example motion capture scene including a group of motion capture markers.

FIG. 1 is a block diagram illustrating an example motion capture system 100. As depicted, the motion capture ("MOCAP") system 100 includes a capture space 110, motion capture cameras 120A-C, a motion capture processing system 130, a group tracking system 132, markers 140A-C, and an actor 160.

The capture space 110 is the volume in which the motion capture cameras 120A-C capture motion. Markers 140A-C are coupled to the actor 160, and the actor 160 performs within the capture space 110. The motion capture processing system 130 receives sequences of frames of image data from the motion capture cameras 120A-C and integrates them to generate three-dimensional ("3-D") volume data representing a model of the actor's movements during performance. A sequence of frames of volume data is referred to as a "beat." The motion capture processing system 130 typically further includes interface and display modules (not shown).

In one implementation, the markers 140A-C coupled to the body of the actor 160 are small retro-reflective spheres. The capture space 110 is illuminated with high power lights, and the markers 140A-C reflect the illumination as bright points of light which are captured in the image data generated by the motion capture cameras 120A-C.

In the example depicted in FIG. 1, the markers 140A-C are attached to the upper left arm of the actor 160. The markers 140A-C define a group 150. Since the upper forearm is a relatively rigid part of the body, the markers 140A-C will remain substantially rigidly disposed with respect to each other during the performance by the actor 160. A local coordinate system may therefore be defined with respect to the group 150, in which the markers 140A-C are substantially translationally and rotationally invariant from frame to frame.

The group tracking system 132 receives beat data from the motion capture processing system 130 and performs group tracking functions on the marker data captured in the beat. Markers are uniquely labeled such that their trajectories through the sequential 3-D volumes of the beat may be captured and applied to virtual actors or objects. Group tracking involves tracking markers of interest as a group instead of individually, providing greater accuracy and efficiency to the general marker tracking process.

Figure 2:
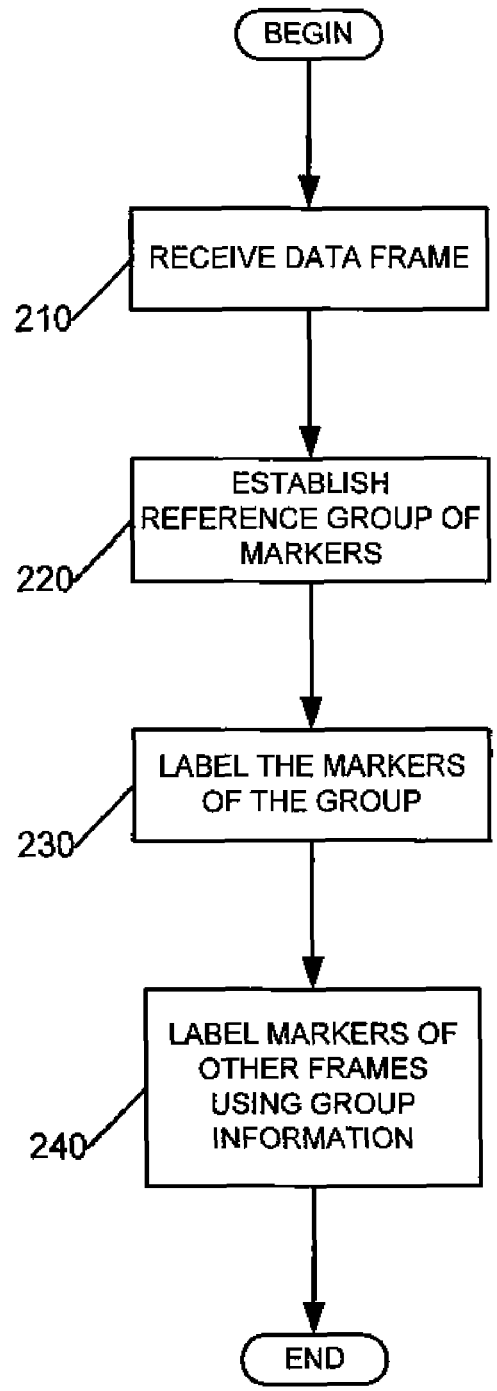
FIG. 2 is a flowchart of an example method of group tracking.

FIG. 2 is a flowchart of an example method of group tracking 200. Using a single frame of labeled data to establish a group relationship, the group tracking function attempts to label unlabeled markers which belong to the group on all frames forward or backward from a starting frame in a beat. In general, already labeled markers are not relabeled.

A data frame is received, at 210. The received data frame typically includes a plurality of unlabeled motion capture marker data points from which a reference group is developed. The data frame may be a first data frame of the beat, it may be the last data frame, or it may be any frame in between the first and last data frames. The reference group is established at 220 (see FIGS. 3A and 3B), and includes at least a predetermined minimum number of markers selected from the plurality of markers present in the data frame. The markers are identified by their positions in the volume represented by the data frame. The group of markers also has an inherent shape that is used in labeling markers in other data frames. The markers of the group are labeled at 230. Labeling includes associating a unique identification to each marker of the group for easy distinction within the group. At 240, groups of markers in the other data frames of the beat are established in correspondence with the reference group in the initial data frame (see also FIGS. 4A and 4B). The markers in the corresponding group in each of the other data frames are labeled in correspondence with the unique labels associated with the markers of the reference group. A trajectory of each marker of the reference group is thus developed through a sequence of data frames, where each marker is identified by its unique label.

Figure 3A:
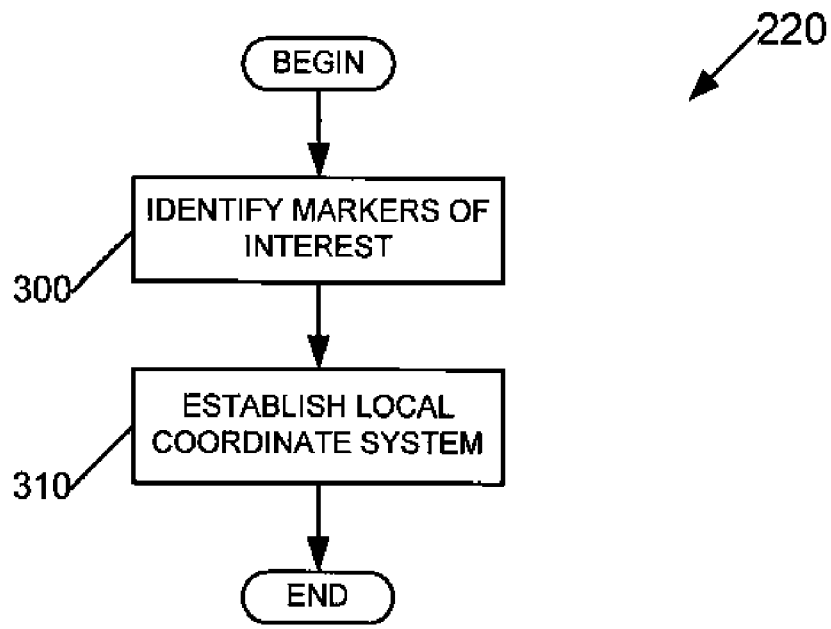
FIG. 3A is a flowchart of an example method of establishing a reference group of markers.
Figure 3B:
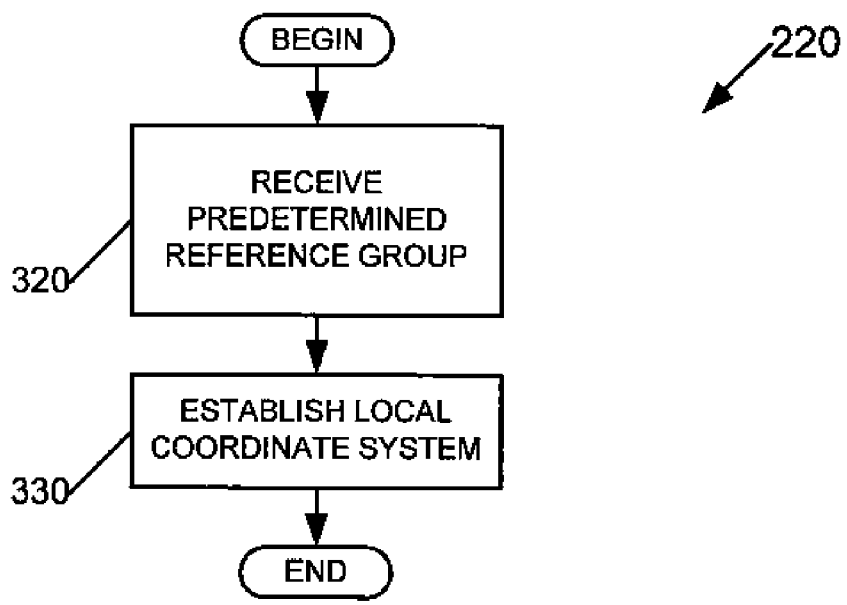
FIG. 3B is a flowchart of an alternative method of establishing a reference group of markers.

FIGS. 3A and 3B are flowcharts of example methods of establishing a reference group of markers, as performed according to box 220 of the flowchart depicted in FIG. 2. In FIG. 3A, at 300, markers of interest are identified in the initial data frame. For example, in reference to FIG. 1, the three markers 140A-C disposed on the upper arm of the actor 160 can be selected in the initial data frame to define a marker reference group for tracking over the data frames of the beat. These markers of interest may be selected in a variety of ways. For example, a software tool can enable a user to establish the reference group by selecting with a cursor markers displayed on a computer screen. At 310, a coordinate system local to the marker reference group is established. The local coordinate system is used to aid labeling of markers in subsequent frame data by providing a translationally and rotationally invariant volumetric framework for analysis. It will be appreciated that such a coordinate system may be developed in a number of ways by one of ordinary skill in the art.

FIG. 3B is a flowchart of an alternative method of establishing a reference group of markers, as performed according to box 220 of the method depicted in FIG. 2. At 320, a predetermined reference group is received. In one example, in reference to FIG. 1, a reference group including the markers 140A-C disposed on the upper arm of a particular actor 160 is established and stored. The stored reference group can be recalled and applied to the upper arm marker data generated during a later performance by that particular actor 160. A database of reference group data can be maintained and accessed for any actor or object in a motion capture scene, thus simplifying, and providing consistency to, marker tracking. At 330, a coordinate system local to the marker reference group is established as discussed above in relation to box 310.

Figure 4A:
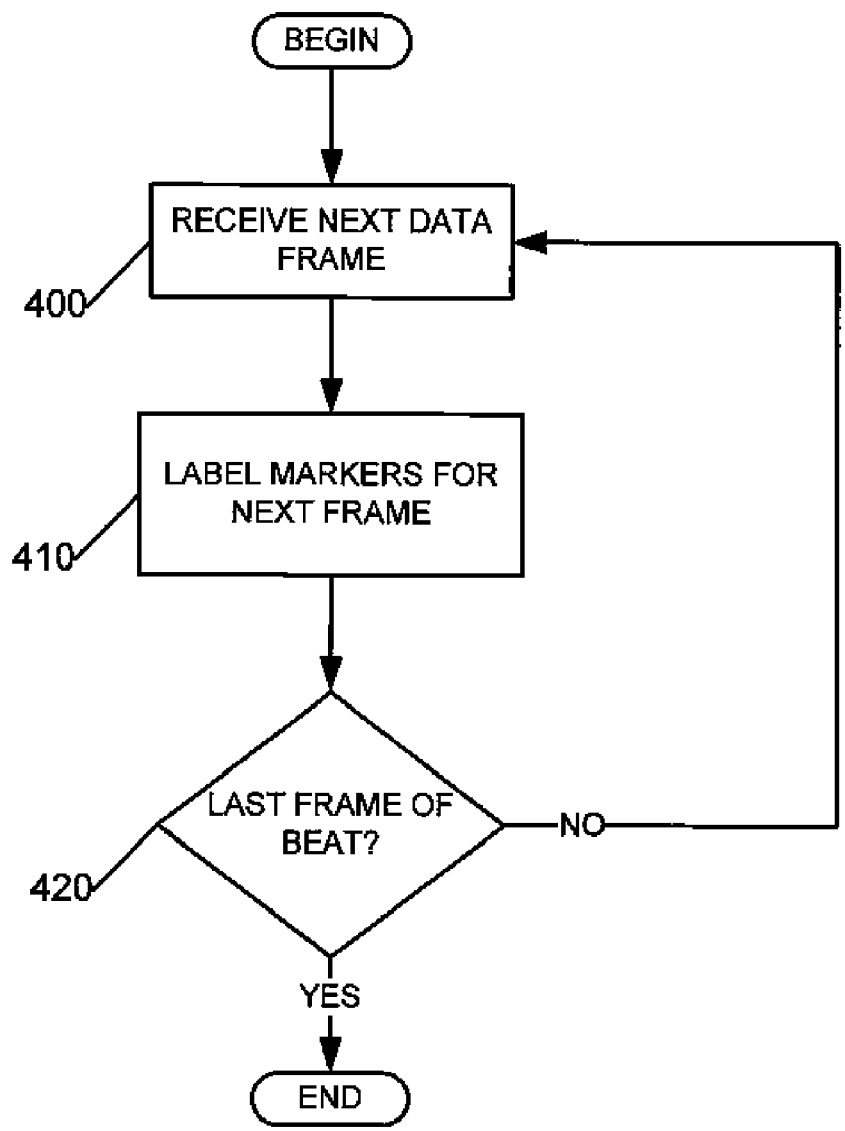
FIG. 4A is a flowchart of an example method of labeling marker groups in a sequence of motion capture frames.
Figure 4B:
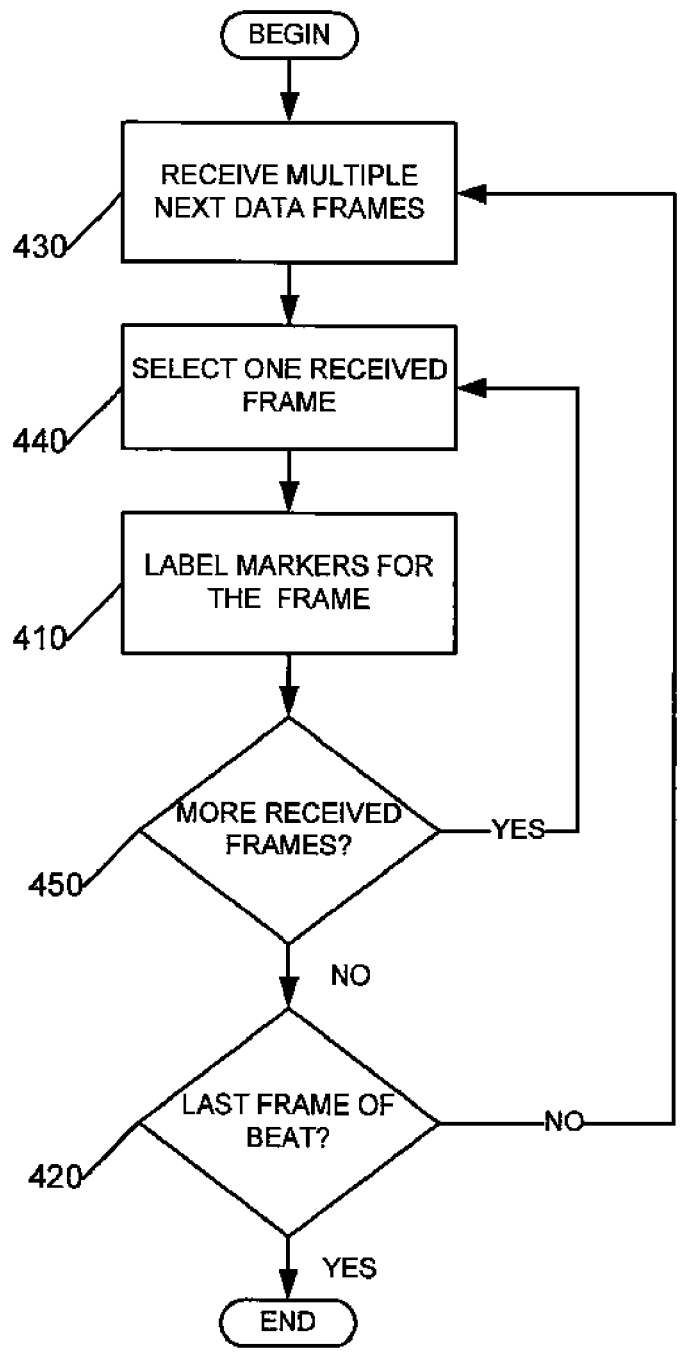
FIG. 4B is a flowchart of an alternative method of labeling marker groups in a sequence of motion capture frames.

FIGS. 4A and 4B are flowcharts of example methods of labeling groups of markers in a sequence of motion capture frames, as performed according to box 240 of the flowchart depicted in FIG. 2. A next data frame is received at 400. The next data frame includes unlabeled markers, and can be following in sequence or preceding in sequence. The next data frame can also be adjacent in the sequence, or can be one or more frames removed in the sequence from the current frame. Once the next frame is received, it is referred to as the "current frame."

Figure 5:
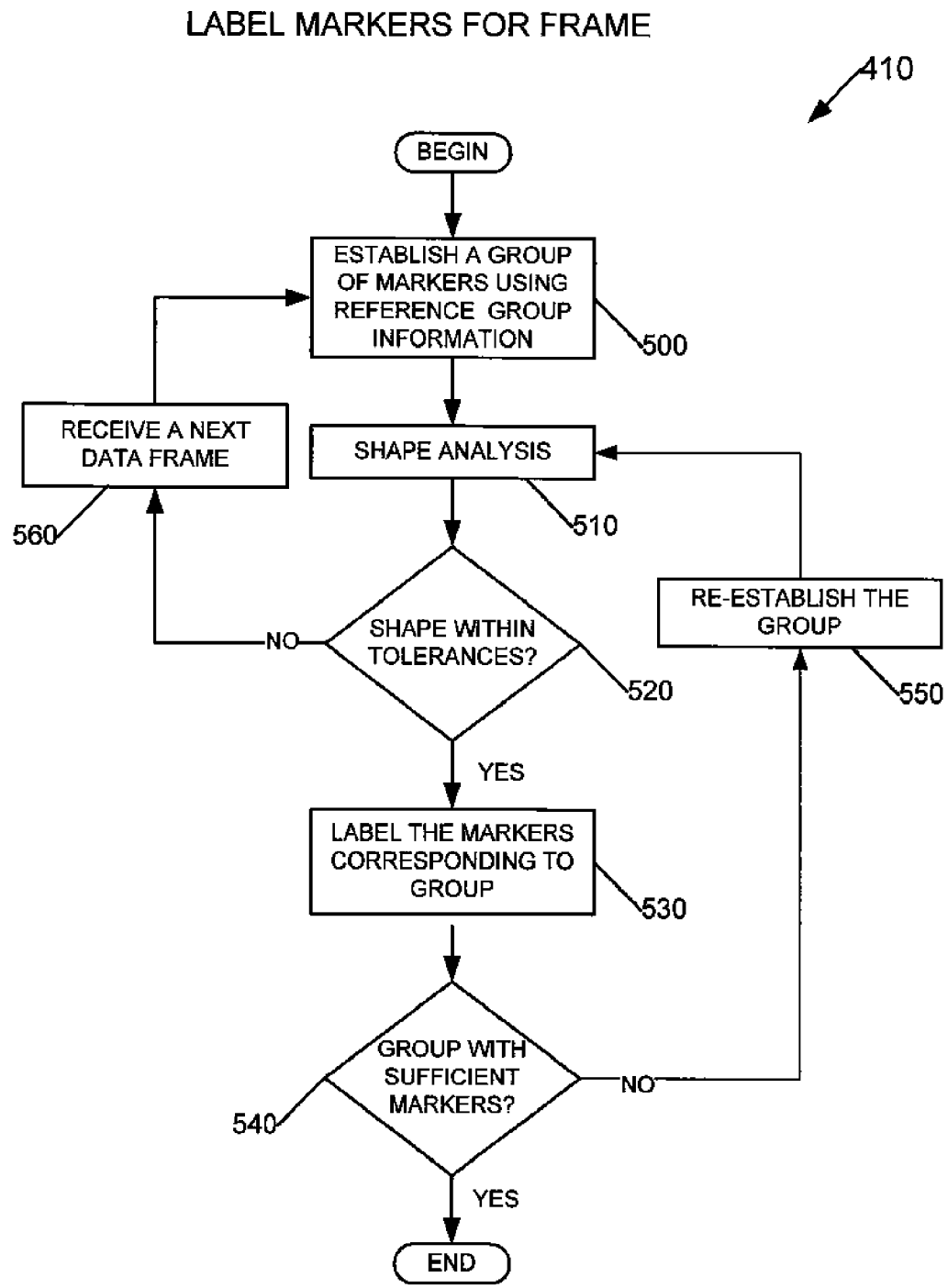
FIG. 5 is a flowchart of an example method of labeling marker groups in a motion capture frame.

At 410, unlabeled markers in the current frame corresponding to the markers included in the marker reference group are labeled (see also FIG. 5). A test is applied at 420 to determine if more data frames in the beat remain to be processed by group tracking. If the current frame is not the last frame of the beat to be processed, then box 400 is executed again and a next data frame is received.

FIG. 4B is a flowchart of an alternative method of labeling groups of markers in a sequence of motion capture frames, as performed according to box 240 of the flowchart depicted in FIG. 2. It is often useful to analyze some number of data frames ahead to determine if some markers in the group are not present in one frame or another. For example, a marker may be labeled in one data frame but then "disappear" in the next frame only to "reappear" in the subsequent frame after that. A determination can be made not to attempt to label that marker in a data frame where it is missing when a more ideally suited corresponding marker is present in a subsequent data frame. Moreover, no attempt is made to improperly label some outlying or non-conforming marker as part of the group to compensate for the missing marker.

Multiple next data frames are received at 430. The multiple next data frames include unlabeled markers, and can be a data frames following in sequence, or preceding in sequence to the current frame. One of the multiple received data frames is then selected and becomes the current frame at 440.

At 410, unlabeled markers in the current frame corresponding to the markers included in the marker reference group are labeled (see also FIG. 5). A test is applied at 450 to determine whether there are more data frames yet to be processed among the multiple data frames received at 430. If more data frames are left to be processed, then one is selected to be the current frame at 440. Otherwise, another test is applied at 420 to determine if more data frames in the beat remain to be processed by group tracking. If the current frame is not the last frame of the beat to be processed, then box 430 is executed again and another set of multiple next data frames are received.

FIG. 5 is a flowchart of an example method of labeling marker groups in a motion capture frame, as performed according box 410 of the flowchart depicted FIG. 4. A group of unlabeled markers in the current data frame is established at 500 (see also FIG. 6).

In one implementation, shape analysis is employed to eliminate, or substantially minimize, incorrect marker labeling. Accordingly, a shape analysis is performed at 510 (see also FIG. 7). A measure of the deviance of the shape of the unlabeled markers (of the group) from the shape of the reference group is generated at 510 and is tested against one or more tolerances at 520. When the deviance measure is within the tolerances, the unlabeled markers comprising the group are labeled at 530. When the deviance measure is not within the tolerances, a next data frame is received at 560. In one implementation, according to the method illustrated in FIG. 4A, the next data frame is received at 560 similarly to 400. In another implementation, according to the method illustrated in FIG. 4B, the next data frame is received at 560 similarly to way in which a data frame is selected from multiple received next data frames at 440. In the case of either implementation, the received data frame becomes the current data frame in which a group of markers is established at 500.

After the unlabeled markers comprising the group are labeled at 530, a test is applied at 540 to determine whether the group includes a sufficient number of markers, labeled and unlabeled. In one example, the minimum number is three markers (labeled and unlabeled) in order to adequately define a local coordinate system. If the number of labeled and unlabeled markers falls below the minimum, an attempt is made to reestablish the group in the next frame. Accordingly, box 550 is performed to re-establish the marker group (see also FIG. 8).

Figure 6:
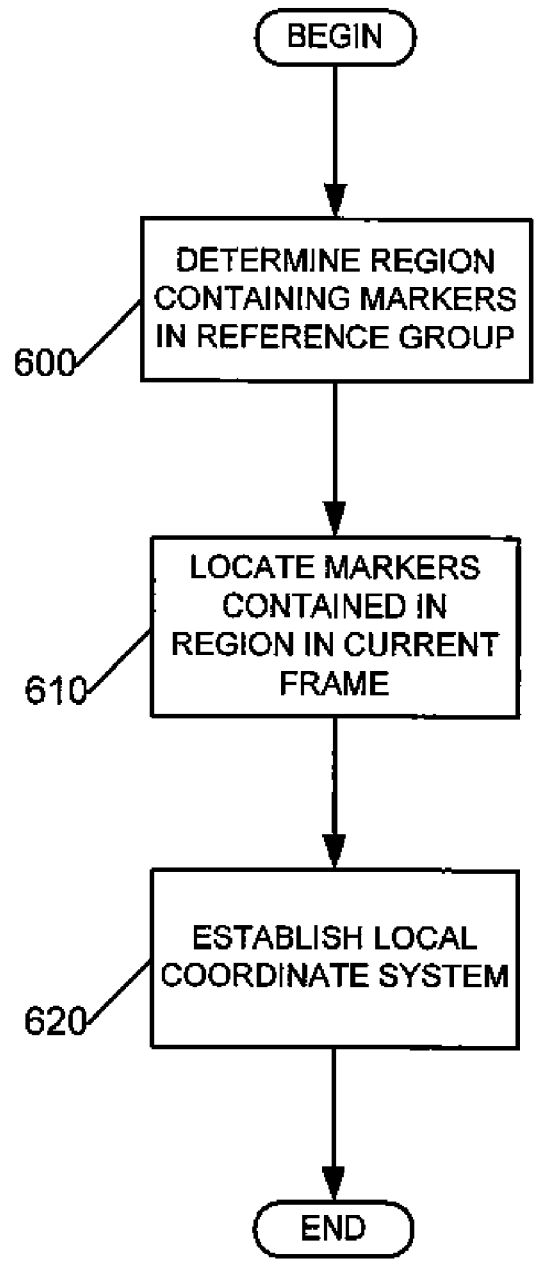
FIG. 6 is a flowchart of an example method of establishing a group of motion capture markers.

FIG. 6 is a flowchart of an example method of establishing a group of motion capture markers, as performed according box 500 of the flowchart depicted FIG. 5. At 600, a volumetric region is determined within which the labeled markers of the reference marker group are disposed. In one implementation, this region is predetermined when the reference group is first established at 220 (see FIGS. 2, 3A and 3B). A description of the region is carried forward in reference group information. The region may have any shape serving to include all of the labeled markers and exclude the rest. Ordinarily, an easily represented shape such as a sphere is used. Unlabeled markers in the current frame that are disposed within the region are isolated from all other unlabeled markers. The markers disposed inside the region are located at step 610 and retained as part of the group. In one implementation, a local coordinate system is established in the current frame at 620, similarly to boxes 310 and 330 of FIGS. 3A and 3B, respectively.

Figure 7:
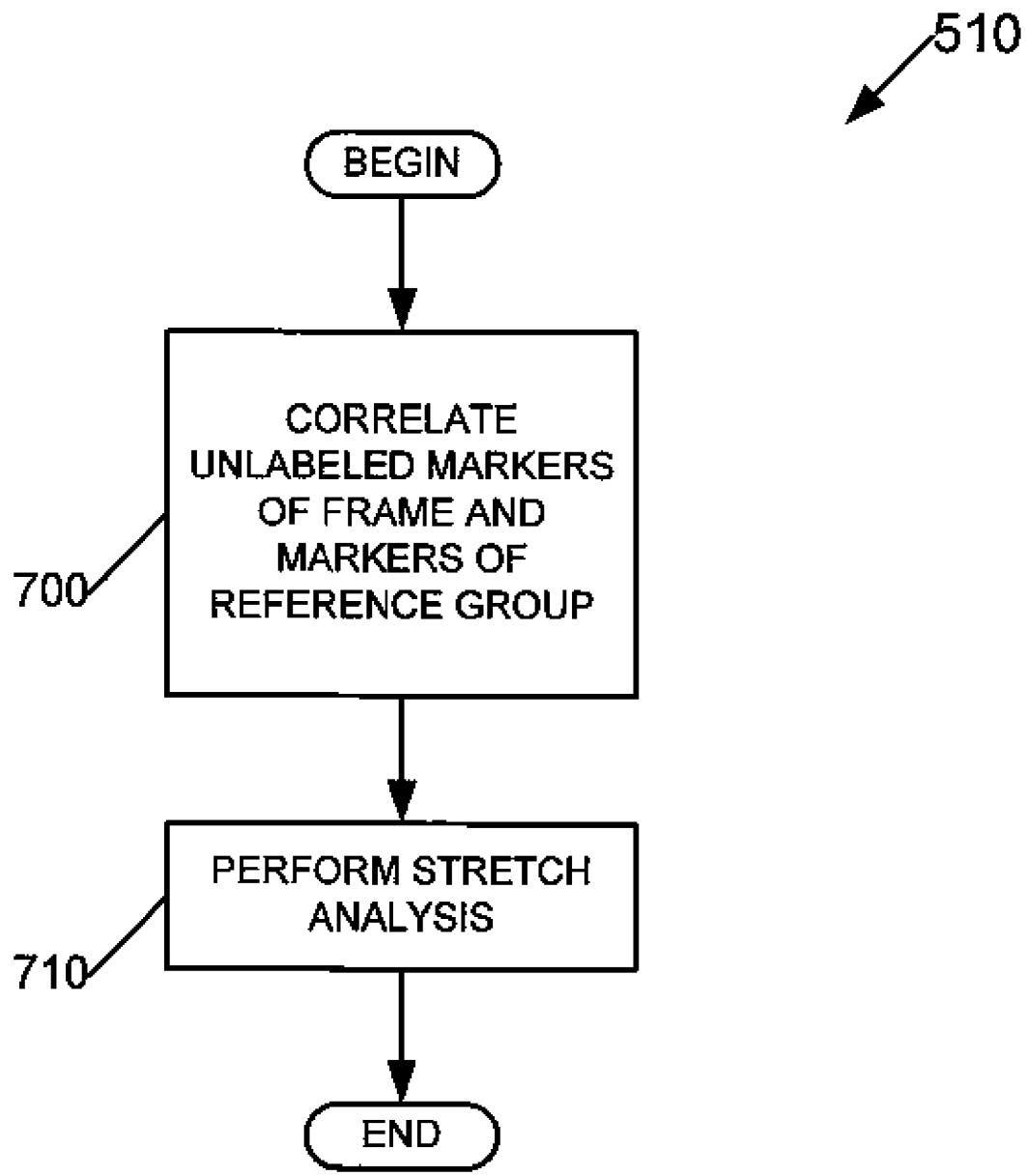
FIG. 7 is a flowchart of an example method of shape analysis of a group of motion capture markers.

FIG. 7 is a flowchart of an example method of shape analysis for a group of motion capture markers, as performed according box 510 of the flowchart depicted FIG. 5. Unlabeled markers of the current frame are correlated with corresponding markers of the reference group, at 700. The positions of the markers define the "shape" of the group in the local coordinate system. Accordingly, a translationally and rotationally invariant comparison can be made between the positions of the unlabeled markers and positions of the labeled markers in the reference group. The unlabeled markers disposed most closely to the labeled markers are selected as candidates for group membership in the current frame.

The kinetic properties of each labeled marker, derived from its trajectory through the data frame sequence can aid in correlating the unlabeled markers to labeled markers. For example, velocity and inertia information characterizing a marker's motion through the sequence of processed data frames can be propagated into the current frame to predict where that marker may be disposed.

Further aid in correlating the unlabeled markers to labeled markers is provided by "assisted group tracking," utilizing the relative positions of other, unrelated marker groups to the group of interest in the current frame.

In one implementation, processing may be stopped when correlating the unlabeled and labeled markers results in multiple solutions matching two or more unlabeled markers in the current frame with one or more labeled markers in the reference group. A user may then intervene and manually select, for example, a best marker in the current frame for labeling.

A stretch analysis is performed on the group in the current frame ("current group") at 710. In one implementation, a simple stretch analysis compares the group stretch with a predetermined group stretch value within a +/−tolerance. That is, the positions of the markers defining the shape in the current group are allowed to deviate within the tolerance from the shape defined by the shape of the reference group.

In another implementation, a learned stretch analysis is implemented. Shape information of the reference group in frames that have already been labeled may be used to define a group stretch value (e.g., +/−some tolerance). The frames which provide this information may be a part of the present beat, or from an external storage source. These frames are previously labeled in the present beat, or another beat, where the markers are placed substantially identically. The user saves the stretch range values for some sequence of frames in which the group is defined. The stretch ranges are then saved into a group track repository as predetermined stretch values for those markers. Several such predetermined stretch values can thus be stored and recalled for any given group of markers defined by a user.

In another implementation, a facial action coding system (FACS) stretch is employed. Facial movement captured through markers and/or electrodes placed on an actor's face to record movement and/or muscle activity is used to build and animate a facial model. (See, e.g., U.S. patent application Ser. No. 10/984,488, entitled "System and method for tracking facial muscle and eye motion for computer graphics animation" filed Nov. 8, 2004.) Using the FACS information as to how groups of markers move on a particular actor's face, a stretch analysis can be performed for the group based on the FACS constraints. In one implementation, users would be required to choose markers in FACS groups. A look up table for each actor and each marker group provides a dynamic group stretch and group definition to label the markers of the current group correctly, to maintain the local coordinate system, and to avoid "swaps" (where a marker from one group comes into close proximity to a marker of another group and their labels are incorrectly cross-assigned).

In another implementation, stretch analysis is also used to determine if labeling should continue or stop altogether. For example, when the group stretch is determined to be beyond tolerances, labeling ceases.

Figure 8:
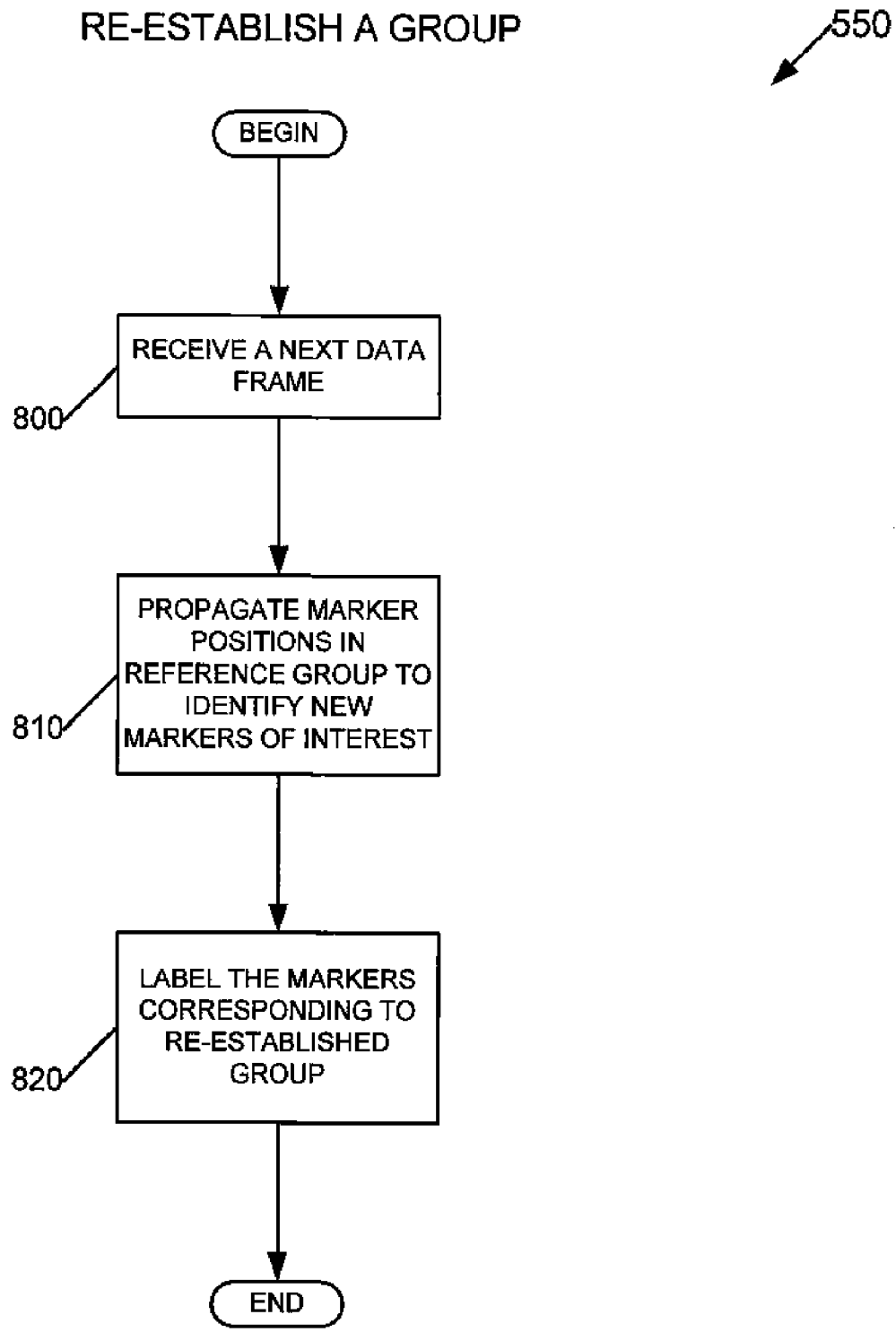
FIG. 8 is a flowchart of an example method of re-establishing a group of motion capture markers.

FIG. 8 is a flowchart of an example method of re-establishing a reference group of markers, as performed according box 550 of the flowchart depicted FIG. 5. A next data frame is received, at 800. The received next data frame becomes the current frame. At 810, kinetics information, such as velocity and inertia, characterizing the motion of the markers of the reference group is propagated through the sequence of processed data frames. In one implementation, the kinetics information is determined at each current frame, making it possible to simply access recently updated propagation information instead of computing it. The information is then used to predict where in the current frame the group's unlabeled markers are likely to be disposed. Markers thus located are labeled at 820.

Figure 9A:
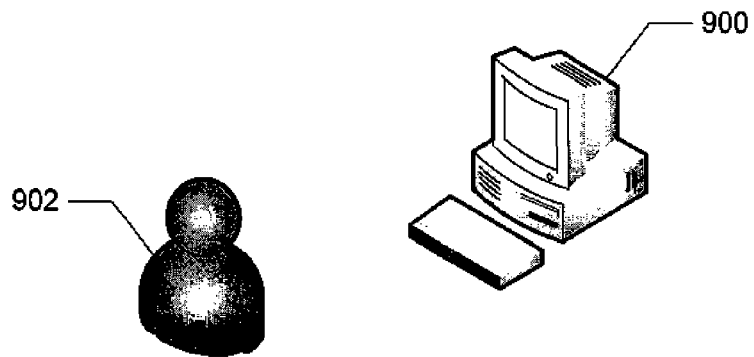
FIG. 9B is a functional block diagram illustrating an example group tracking system hosted by a computer system.

FIG. 9A illustrates a representation of a computer system 900 and a user 902. The user 902 can use the computer system 900 to perform group tracking. The computer system 900 stores and executes a group tracking system 916 (functionally similar to the group tracking system 132 depicted in FIG. 1), which processes motion capture frame data.

Figure 9B:
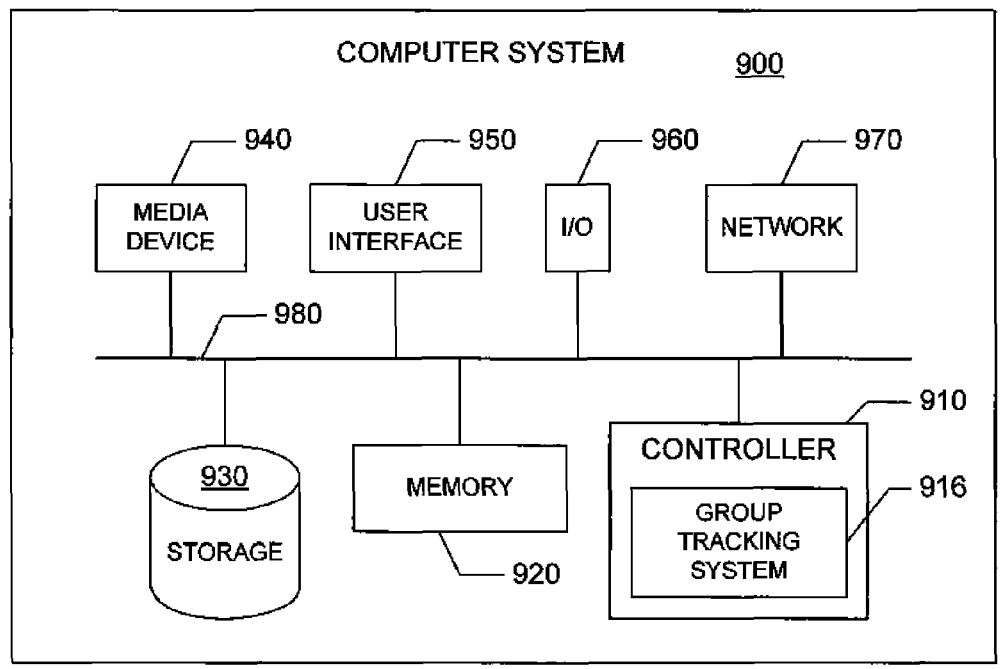

FIG. 9B is a functional block diagram illustrating the computer system 900 hosting the group tracking system 916. The controller 910 is a programmable processor and controls the operation of the computer system 900 and its components. The controller 910 loads instructions from the memory 920 or an embedded controller memory (not shown) and executes these instructions to control the system. In its execution, the controller 910 provides the group tracking system 916 as a software system. Alternatively, this service can be implemented as separate components in the controller 910 or the computer system 900.

Memory 920 stores data temporarily for use by the other components of the computer system 900. In one implementation, memory 920 is implemented as RAM. In another implementation, memory 920 also includes long-term or permanent memory, such as flash memory and/or ROM.

Storage 930 stores data temporarily or long term for use by other components of the computer system 900, such as for storing data used by the group tracking system 916. In one implementation, storage 930 is a hard disk drive.

The media device 940 receives removable media and reads and/or writes data to the inserted media. In one implementation, the media device 940 is an optical disc drive.

The user interface 950 includes components for accepting user input from the user of the computer system 900 and presenting information to the user. In one implementation, the user interface 950 includes a keyboard, a mouse, audio speakers, and a display. The controller 910 uses input from the user to adjust the operation of the computer system 900.

The I/O interface 960 includes one or more I/O ports to connect to corresponding I/O devices, such as external storage or supplemental devices (e.g. a printer or a PDA). In one implementation, the ports of the I/O interface 960 include ports such as: USB ports, PCMCIA ports, serial ports, and/or parallel ports. In another implementation, the I/O interface 960 includes a wireless interface for communication with external devices wirelessly.

The network interface 970 includes a wired and/or wireless network connection, such as an RJ-45 or "Wi-Fi" interface (including, but not limited to 802.11) supporting an Ethernet connection.

The computer system 900 includes additional hardware and software typical of computer systems (e.g., power, cooling, operating system), though these components are not specifically shown in FIG. 9B for simplicity. In other implementations, different configurations of the computer system can be used (e.g., different bus or storage configurations or a multi-processor configuration).

Figure 10:
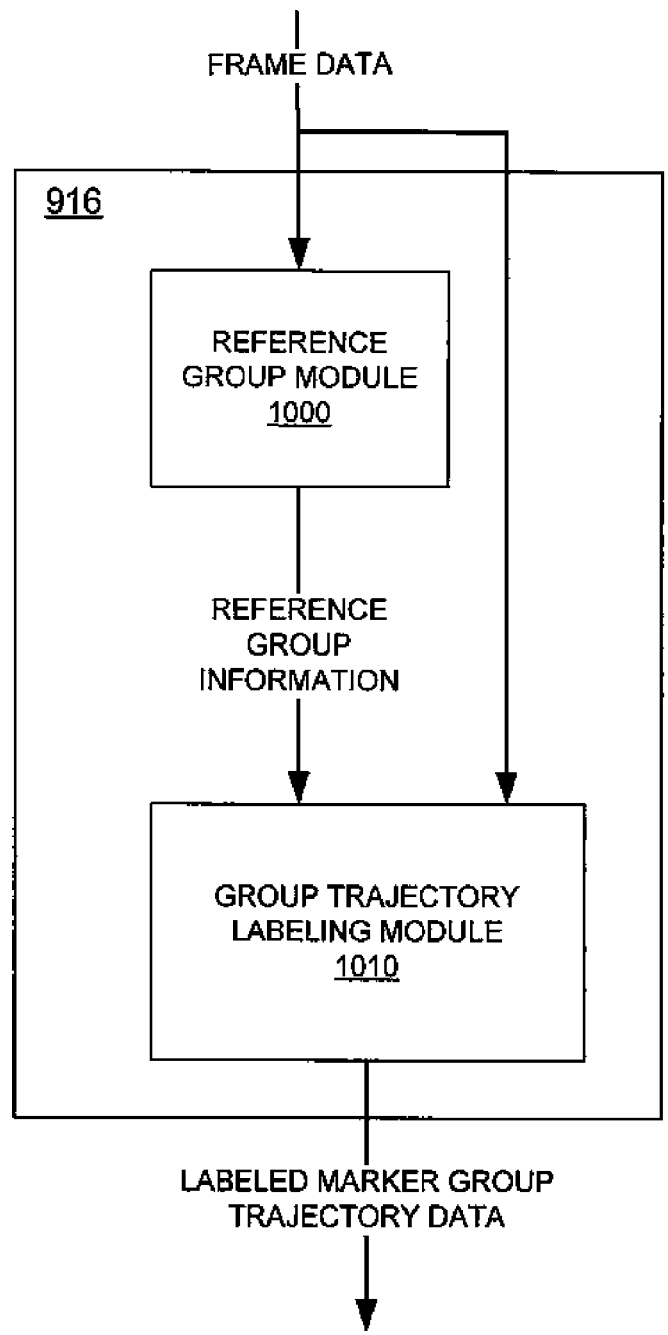
FIG. 10 is a functional block diagram illustrating an example group tracking system.

FIG. 10 is a functional block diagram illustrating an example group tracking system 916 depicted in FIG. 9. The group tracking system 916 includes a reference group module 1000 and a group trajectory labeling module 1010. The reference group module 1000 receives frame data from an initial frame in a beat and including unlabeled markers. The initial frame may be any data frame in the beat, including the first data frame, the last data frame, and any frame between the first and last data frames. From the frame data, the reference group module 1000 generates reference group information. In one implementation, the reference group module 1000 performs boxes 210, 220 and 230 shown in FIG. 2.

Figure 11:
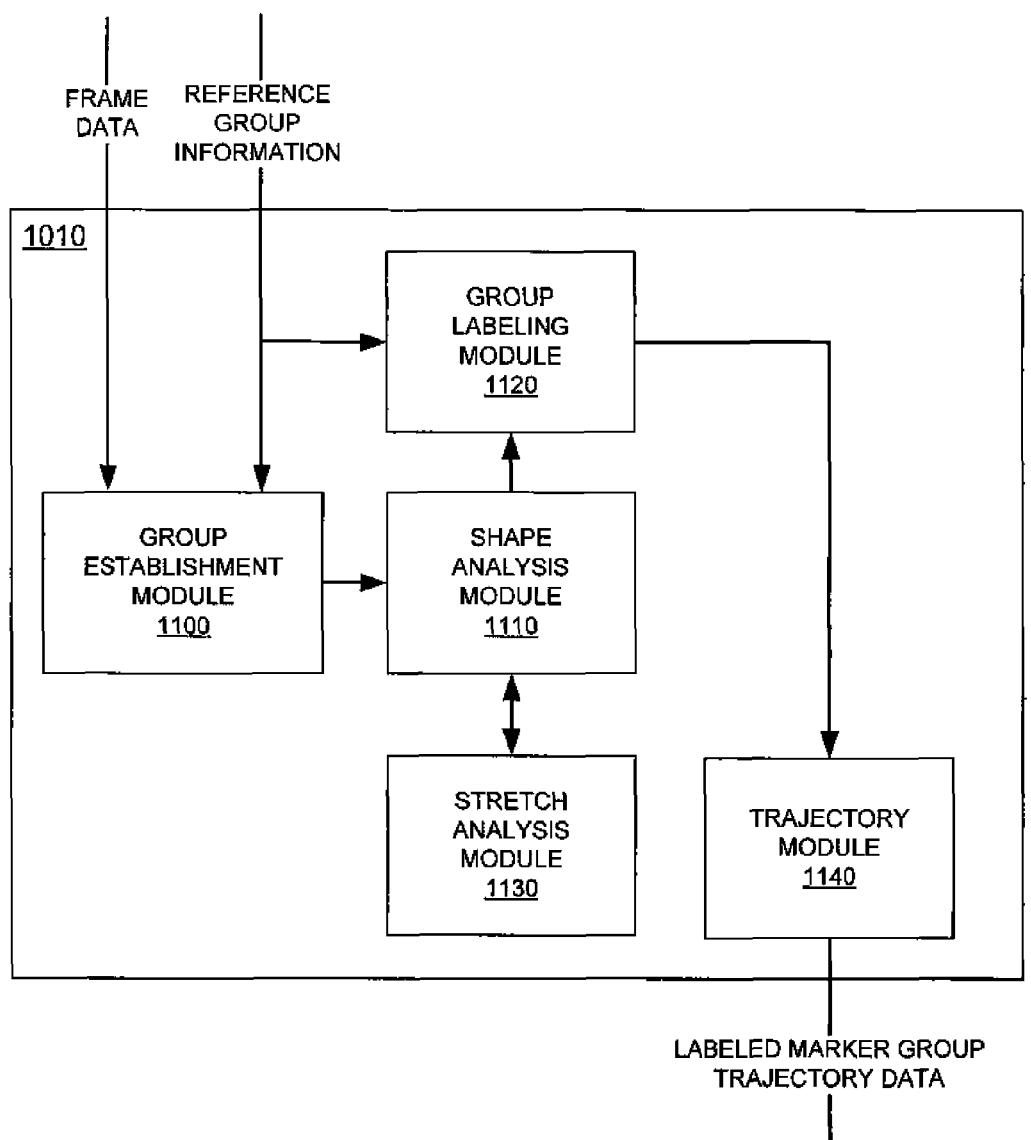
FIG. 11 is a functional block diagram illustrating an example group trajectory labeling module.

The group trajectory labeling module 1010 receives reference group information and frame data and generates labeled marker group trajectory data (see also FIG. 11). The labeled marker group trajectory data include the trajectories of labeled markers of one or more groups tracked through the sequence of data frames of at least a portion of the beat. In one example, the trajectory of a group of labeled markers represents the movement of markers (e.g., 140A-C shown in FIG. 1) during a performance given by the actor 160 in the motion capture space 110. The trajectories of the markers 140A-C represent the movement of the actor's 160 upper arm, and can be used accordingly to command the motion of the upper arm of a virtual character in an animation.

FIG. 11 is a functional block diagram illustrating an example group trajectory labeling module 1010 depicted in FIG. 10. The group trajectory labeling module 1010 includes a group establishment module 1100, a shape analysis module 1110, a group labeling module 1120, a stretch analysis module 1130, and a trajectory module 1140.

The group establishment module 1100 receives reference group information (e.g., from the reference group module 1000) and frame data and generates information as to which unlabeled markers in the frame data are included in a group. The group establishment module 1100, in one implementation, generally performs a method to establish a group of markers as depicted in FIG. 6.

The group marker information is passed to the shape analysis module 1100, which generates information as to whether the unlabeled markers should be labeled, based on the shape and group stretch characteristics of the unlabeled markers. This information is passed to the group labeling module 1120. The shape analysis module 1100 generally performs the method described in FIG. 7. Accordingly, the shape analysis module 1100 passes shape and marker information to the stretch analysis module 1130. The stretch analysis module 1130 in turn passes information as to the stretch characteristics of the unlabeled markers back to the shape analysis module 1100.

The group labeling module 1120 receives the information from the shape analysis module 1100 regarding whether any markers should be labeled, and labels (or does not label) the markers accordingly. The group labeling module 1120 generally performs box 530 in FIG. 5. Information regarding (labeled and unlabeled) markers and groups is passed to the trajectory module 1140, which generates the labeled marker group trajectory data including the trajectories of labeled markers of one or more groups that are tracked through the sequence of data frames of the beat.

One implementation of the present invention includes a capability to ignore sequences in a group trajectory and stop instead on trajectory "end" frames where labeling is being attempted and stretch values are being exceeded. A user may thus navigate to a troublesome data frame for intervention while avoiding having to reprocess the data frames having previously labeled markers. In this case, for example, the current frame displayed to the user would be the frame at which the group tracker ceased labeling.

Another implementation includes a capability to either label an entire trajectory, or alternatively analyze each data frame of trajectory data to make sure that each frame of new data satisfies group tracking requirements.

In another implementation, to aid in detecting a marker swap condition, capabilities are provided to stop at any frame in a sequence of labeled frames comprising a group trajectory where a stretch value is exceeded in the group. A non-labeling mode is further provided in which swap conditions are detected and repaired in the already labeled frames of the group, but no attempts are made to label unlabeled or known markers outside of the group. Thus, a user can concentrate only on repairing swap conditions without additional processing required for marker labeling.

Additional variations and implementations are also possible. It will further be appreciated that the grouping of functions within a module, block or step is for ease of description. Specific functions or steps can be moved from one module to another without departing from the invention.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Thus, it is to be understood that the description and drawings presented herein represent a presently preferred implementation of the invention and are therefore representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

What is claimed is:

1. A computer-implemented method of tracking a group of motion capture markers in a sequence of frames stored on a non-transitory tangible storage medium, the method comprising:
    establishing a group relationship among a plurality of motion capture markers in a current frame;
    labeling said plurality of motion capture markers in said current frame as a group using said group relationship,
    wherein said plurality of motion capture markers in said current frame forms an inherent shape which is used in labeling markers in other frames, and
    wherein each motion capture marker in said plurality of motion capture markers is identified by its position in the inherent shape; and
    labeling a plurality of unlabeled motion capture markers in a next frame using said group relationship and based on a shape analysis of the group to substantially minimize incorrect marker labeling.

2. The method of claim 1, wherein said next frame is a following frame.

3. The method of claim 1, wherein said next frame is a previous frame.

4. The method of claim 1, wherein said shape analysis includes a stretch analysis.

5. The method of claim 4, wherein said stretch analysis includes FACS stretch.

6. The method of claim 4, wherein said plurality of motion capture markers are labeled such that deviance from a group stretch is minimized.

7. The method of claim 6, wherein said group stretch is defined in another frame.

8. The method of claim 1, further comprising
    omitting labeling a plurality of motion capture markers in an intervening frame disposed between said current frame and said next frame.

9. The method of claim 1, wherein a particular marker is not labeled when multiple labeling solutions for said particular marker exist.

10. The method of claim 1, wherein said group relationship includes
    at least a predetermined number of motion capture markers.

11. The method of claim 10, wherein said predetermined number is three.

12. The method of claim 1, wherein when said group relationship includes fewer than a predetermined number of motion capture markers, said group relationship is re-established among a plurality of motion capture markers in a next frame.

13. The method of claim 12, wherein said predetermined number is three.

14. The method of claim 12, wherein another group relationship is used to assist in re-establishing said group relationship in said next frame.

15. The method of claim 1, further comprising
    establishing a coordinate system.

16. The method of claim 15, further comprising
    configuring said coordinate system for translational invariance with respect to said group relationship.

17. The method of claim 15, further comprising
    configuring said coordinate system for rotational invariance with respect to said group relationship.

18. A storage medium configured to store at least one image created using the method of claim 1.

19. The storage medium of claim 18, wherein said at least one image is configured to form a motion picture.

20. A system for tracking a group of motion capture markers in a sequence of frames, comprising:
    a reference group module, for generating a reference group of motion capture marker information about the group of motion capture markers; and
    a group trajectory labeling module, for generating labeled marker group trajectory data of the group of motion capture markers using said reference group of motion capture marker information,
    wherein the labeled marker group trajectory data of motion capture markers is based on a shape analysis of the reference group to substantially minimize incorrect marker labeling,
    wherein said group of motion capture markers forms an inherent shape, and wherein each motion capture marker in said group of motion capture markers is identified by its position in the inherent shape which is used in labeling markers in other frames.

21. The system of claim 20, wherein said reference group module is configured to generate said reference group of motion capture marker information using selected motion capture markers of interest.

22. The system of claim 20, wherein said reference group module is configured to generate said reference group of motion capture marker information using a predetermined reference group.

23. The system of claim 20, wherein said group trajectory labeling module further comprises
a group establishment module for establishing a group relationship among a plurality of motion capture markers in a current frame.

24. The system of claim 20, wherein said group trajectory labeling module further comprises
a shape analysis module for generating shape analysis information to aid in said generating labeled marker group trajectory data.

25. The system of claim 24, wherein said group trajectory labeling module further comprises
a stretch analysis module for aiding in said generating shape analysis information.

26. A storage medium configured to store at least one image created using the system of claim 20.

27. The storage medium of claim 26, wherein said at least one image is configured to form a motion picture.

28. An apparatus tracking a group of motion capture markers in a sequence of frames, comprising:
means for establishing a group relationship among a plurality of motion capture markers in a current frame;
means for labeling said plurality of motion capture markers in said current frame as a group using said group relationship,
wherein said plurality of motion capture markers in the current frame forms an inherent shape which is used in labeling markers in other frames, and
wherein each motion capture marker in said plurality of motion capture markers is identified by its position in the inherent shape; and
means for labeling a plurality of unlabeled motion capture markers in a next frame using said group relationship and based on a shape analysis of the group to substantially minimize incorrect marker labeling.

29. The apparatus of claim 28, further comprising
means for omitting labeling a plurality of motion capture markers in an intervening frame disposed between said current frame and said next frame.

30. The apparatus of claim 28, further comprising
means for establishing a coordinate system.

31. The apparatus of claim 30, further comprising
means for configuring said coordinate system for translational invariance with respect to said group relationship.

32. The apparatus of claim 30, further comprising
means for configuring said coordinate system for rotational invariance with respect to said group relationship.

33. A storage medium configured to store at least one image created using the apparatus of claim 28.

34. The storage medium of claim 33, wherein said at least one image is configured to form a motion picture.

* * * * *